Patented Oct. 9, 1945

2,386,354

UNITED STATES PATENT OFFICE 2,386,354

PRODUCTION OF DIOLEFINS

Walter A. Schulze, John C. Hillyer, and Harry E. Drennan, Bartlesville, Okla., assignors to Phillips Petroleum Company, a corporation of Delaware No Drawing. Application August 24, 1940, Serial No. 354,086

5 Claims. (Cl. 260—680)

This invention relates to a process for the production of diolefins by differential or selective absorption from complex hydrocarbon mixtures. It relates more specifically to an improved process for the absorption of butadiene, cyclopentadiene, isoprene, and various hexadienes, from hydrocarbon mixtures containing same and derived from the pyrolytic and/or catalytic treatment of petroleum fractions or suitable hydrocarbon stocks from any source.

The production of diolefinic hydrocarbons, for example butadiene, involves the production and/or segregation of hydrocarbon mixtures comprising said diolefins and the corresponding paraffins and mono-olefins along with hydrocarbons of smaller and larger number of carbon atoms. The concentration of the desired diolefin in a hydrocarbon mixture depends on the method of manufacture and on previous purifying and/or concentrating procedures and may vary over a very wide range. In general the absorption of diolefin from said mixtures is dependent on the use of a reagent of suitable specificity so that substantially only the diolefin is reactive to form a reaction product which is sufficiently unstable to permit complete diolefin recovery therefrom by convenient means.

Certain diolefins including butadiene react with solutions of the cuprous halides, particularly the chloride, to form addition compounds from which the diolefin may subsequently be recovered. While this reaction is not entirely specific for diolefins, the use of aqueous solutions containing cuprous halides in various compositions has been proposed for the absorption of diolefins from hydrocarbon gases. It is reported that under suitable conditions the diolefin addition compound may be precipitated by such a reagent solution, and that subsequent separation of the precipitate from the aqueous medium followed by treatment to recover the diolefin from said precipitate yields a reasonably pure diolefin concentrate. The purity obviously depends on the completeness of the separation between the solid diolefin addition product and the aqueous medium containing other hydrocarbon addition products in solution.

Difficulties are encountered in the preparation of suitable cuprous chloride solutions due to the low water solubility of the salt. Hydrochloric acid solutions and ammoniacal solutions have been proposed, but both are subject to the disadvantage of contamination of the hydrocarbon by hydrochloric acid or ammonia. To avoid this contamination, neutral salt solutions have been suggested. Also the addition of reducing agents such as stannous chloride has been mentioned to prevent the very rapid oxidation of the cuprous salt to the cupric form by air or other oxidizing gases.

However, in processes utilizing cuprous chloride solutions, difficulties in preparing the solution are minor compared to the difficulties encountered in the handling and use of said solutions. Such solutions must be stored, pumped and conveyed in vessels, pumps and piping which resist the corrosive action of the cuprous salt. Since no metals except the noble metals which are not feasible for commercial use fulfill this requirement, equipment for handling cuprous solutions must be fabricated from expensive substitutes such as plastic materials, ceramic or rubber-lined steel, wood or a certain high-silicon alloy. These materials in addition to their high cost have serious limitations in use such as pressure limits, low tensile strength, lack of machinability and need of special maintenance and inspection services. These factors add greatly to the investment cost and maintenance expense for a process utilizing cuprous salt solutions.

Further, as mentioned above, said salt solutions are not specific in the reaction with diolefins, and while the diolefin is the most stable compound formed, significant amounts of other reaction products may be formed from carbon monoxide, acetylene and acetylene derivatives, ethylene hydrocarbons and the like. When these compounds are formed in the total volume of solution being circulated to absorb butadiene, there is no chance of displacing the contaminants and when butadiene is released from the solution it is mixed with impurities. Since the butadiene-cuprous chloride complex is insoluble in the reagent solution, elaborate methods for separating the solid prior to the desorption of butadiene have been proposed. The efficacy of such procedures is limited by the completeness with which the solid is separated from the solution. Operating difficulties are magnified by the necessary handling and transferring solutions containing solid material which settles in lines and valves and clogs gas passages requiring equipment of special design.

In addition, the efficiency of a cuprous salt solution in absorbing amounts of butadiene which may be as low as of the order of 2-10 per cent of the total hydrocarbon mixture is not high. The efficiency is further decreased by the fact that one of the reaction products is a solid which may interfere mechanically with the absorption.

Thus, huge volumes of the absorbing solution must be handled to obtain satisfactory absorption. Low treating rates are necessary along with the high ratios of absorbing medium, so that plant equipment size is exaggerated with respect to actual treating capacity.

The object of this invention is an improved process for absorbing diolefins from hydrocarbon mixtures which eliminates the operating difficulties and excessive costs previously ascribed to the use of cuprous chloride solutions. By this process the diolefin may be recovered in substantially pure form without complicated process steps.

We have found that if hydrocarbons containing butadiene are contacted with a reagent comprising a solid adsorbent material impregnated with a cuprous halide, the diolefin is removed from the hydrocarbon and fixed on the solid reagent as the solid addition product. We have found that our reagent may be used in a cyclic process for the removal of substantially all the butadiene from a hydrocarbon mixture and that butadiene of high purity can be released and recovered by the application of gentle heat or a vacuum to the reagent following the absorption step.

In one specific embodiment of our invention fuller's earth is impregnated with a solution of cuprous chloride and ammonium chloride. Sufficient solution is added to produce a reagent which is 10–25 per cent by weight of cuprous chloride. Repeated additions of solution with intermediate partial drying may be used to give this quantity of adsorbed cuprous salt.

The solid reagent is placed in a reagent tower and the hydrocarbon fluid containing butadiene is passed over the reagent at a suitable flow rate and temperature. Butadiene is retained on the reagent surfaces in the form of the solid addition product. When the reagent becomes saturated with butadiene, the hydrocarbon flow is stopped, and the diolefin is then liberated in substantially pure form by warming the reagent, and with or without evacuation.

Ordinarily an alternate reagent tower is provided to allow for continuous operation in an absorption-regeneration cycle. The towers may be large vessels filled with the solid reagent, or containing a series of trays filled with the reagent. Other suitable construction and reagent arrangements will be apparent to those skilled in the art. Means for providing cooling during the absorption operation, purging of the reagent prior to desorption, and heating during the desorption and regeneration operation are essentials of the tower design.

We have noted that our process is much more efficient in the absorption of diolefins and in obtaining of high-purity diolefin concentrates due to certain advantages obtained by the use of a solid type reagent. We obtained not only more complete absorption of diolefins but also a more efficient utilization of the cuprous halide ingredient of our reagent. This latter effect may be due in part to the exposure of such a great amount of the reagent in ultra-thin layers in the pores and on the surfaces of the adsorbent carrier. To even approach the efficiency of our process with a solution of cuprous halide requires the circulation of huge volumes of said solution, amounting to several gallons of solution per cubic foot of hydrocarbon gas contacted.

An additional advantage of our solid-type reagent is that ideal counter-current treating flow is obtained. The capacity of our reagent for diolefins is gradually and uniformly spent in the direction of flow of the hydrocarbon fluid, a condition which is not obtained in the use of a reagent solution, the entire volume of which is spent to the same degree. In the use of the solid reagent, the portions of the bed first contacted with hydrocarbon fluid are first saturated with diolefin, while the sections of the bed adjacent to the hydrocarbon exit port remain in the most active condition to effect the removal of the smallest concentrations of diolefin.

This countercurrent spending or saturation of the solid reagent is further beneficial in that purer diolefin concentrates are thereby obtained. As the hydrocarbon fluid containing other components than diolefins which are reactive with cuprous halides first contacts the portion of the solid reagent bed adjacent the inlet port, other addition products than the desired diolefin complex are formed. However, the diolefin complex is the most stable compound formed, and as more diolefin passes through said portion of the reagent, the contaminating complexes are displaced by diolefin until when that portion of the reagent is completely saturated with respect to the diolefin, no other addition compounds are present. This displacement process continues through the reagent bed in the direction of hydrocarbon flow until the finally spent or saturated reagent bed retains substantially only diolefins. Subsequent desorption yields a diolefin concentrate of higher purity than any possible operating devices proposed for absorption processes utilizing cuprous halide or other solutions or liquid reagents.

A further advantage of our solid type reagent is that it is adaptable to the absorption of diolefins from hydrocarbon liquids. This adaption makes possible the use of many time and cost saving short cuts in the manufacture and segregation of butadiene as well as increasing greatly the capacity of a unit designed to absorb diolefins from hydrocarbon mixtures. In the treating of hydrocarbon liquids with our solid reagents contact time may be effectively prolonged while greater throughput is actually obtained without loss of efficiency. A solid-type reagent is well suited to liquid-phase treating because of the tremendous surface area exposed to the liquid passing over the reagent, whereas liquid phase absorption by an immiscible reagent solution in which a solid reaction product is being formed is more difficult to operate efficiently.

As carriers for our reagent we may use materials of suitable physical characteristics such as resistance to shattering and high absorbent capacity. Particularly useful are fuller's earth and other adsorbent clays, bauxite, charcoal, silica gel, synthetic activated aluminas and the like.

The carriers may be impregnated with the cuprous salt in any convenient manner. Thus, the adsorbent may be soaked in a salt solution, or the solution may be sprayed as a mist onto the carrier. The latter method gives uniform distribution of the chemical and avoids disintegration of the carrier particles. If the desired weight per cent of cuprous chloride represents a larger volume of solution than the adsorbent carrier can retain, the solution is applied in successive sprayings with intermediate drying to remove excess water. Following the final impregnation, the reagent is dried to the desired water content prior to use. The reagent is not ordinarily dried to an essentially anhydrous condition, but on the other hand the adsorbed water content is not allowed to exceed the adsorptive capacity of the carrier lest cuprous halide solution drain from the reagent or be carried away in the hydrocarbon stream.

The cuprous halide solution may be made up in any suitable strength, but the more concentrated solutions are more satisfactory in obtaining the desired reagent composition. Neutral salts are satisfactory solvents for the cuprous halide although acids or ammonia may be employed with or without subsequent treatment to remove volatile or hydrocarbon-soluble compounds from the finished reagent. Among the salts which are useful are sodium, potassium or ammonium halides, or the halides of the alkaline earth metals and magnesium. Often a saturated solution of the solvent halide is first prepared and the maximum weight of cuprous halide dissolved therein.

Some provision for maintaining the cuprous ion unoxidized is ordinarily made. Thus a minor proportion of a reducing agent such as stannous chloride may be included in the salt solution to prevent oxidation during the steps of impregnation and drying. The use of an inert gas blanket is also useful in preventing oxidation of the reagent during preparation and use.

We prefer to carry out the absorption of butadiene at temperatures most favorable to the formation of the cuprous addition compound, and usually within the range of 10° to 95° F. In the preferred range, the absorption of butadiene is rapid, and the complex formed is stable. Still lower temperatures might be employed as conditions dictate, but the refrigeration requirements are greatly increased. At higher temperatures up to about 120° F. some decomposition of the butadiene-cuprous halide complex is possible.

Pressures required in our process are low superatmospheric pressures although sub-atmospheric pressures may be employed during the desorption step. In general, sufficient pressure is applied to insure satisfactory flow of hydrocarbons through the reagent tower and the auxiliary equipment. Higher pressures may be used, but for gas phase contacting the pressure is limited by the dew-point of the hydrocarbon gas at contacting temperatures. For liquid phase contacting, this limitation is removed.

The flow rate of hydrocarbon fluids is adjusted so that satisfactory absorption of diolefin is obtained. The flow will vary with the condition of the reagent and with the diolefin content of the hydrocarbon mixture. In liquid phase treating flow rates of 1 to 5 liquid volumes of hydrocarbon per hour per volume of reagent are usually satisfactory, although higher or lower rates may be employed. In gas phase contacting, linear velocities of gas less than about five feet per minute are ordinarily satisfactory.

Since the temperature must be maintained at relatively low values during the absorption step, means for removing the heat of formation of the addition complex must be provided. This may be accomplished by precooling the feed and providing indirect heat exchange within the reagent bed. This heat exchange system may then be used to introduce the heat required during the desorption step.

In the desorption operation, temperatures within the range of 120° and 190° F. are most convenient for rapid decomposition of the butadiene-cuprous chloride addition compound. The butadiene may be swept out of the reagent tower by an inert gas and/or vacuum may be applied if desired.

While cuprous chloride is highly satisfactory for our reagent, other cuprous halides as well as the various possible mixture of the halides may be employed under proper conditions if desired. However, the diolefin addition products of cuprous bromide have low decomposition temperatures, and thus are not too readily used in commercial operation.

The following examples will serve to illustrate some of the possible applications of our invention. However, since the invention is subject to numerous modifications within the scope of the foregoing disclosure, said examples are not to be construed as limitations.

Example I

A solution containing 18% of cuprous chloride and 22% of ammonium chloride was sprayed on 8–20 mesh fuller's earth. When the carrier appeared wet it was heated in a stream of inert gas to about 250° F. to drive off a portion of the water. The fuller's earth was then given further spraying and drying in a similar manner until the reagent contained approximately 20% by weight of cuprous chloride. An inert (nonoxidizing) atmosphere was maintained during this treatment. This solid absorbent was placed in a tower provided with means for internal circulation of a cooling medium.

A gas containing butadiene was then allowed to flow through the tower and the butadiene was adsorbed. The gas was a $C_4$ fraction derived from the products of pyrolytic treatment of propane and had the following approximate composition in parts by volume:

| | |
|---|---|
| Butadiene | 35 |
| n-Butylenes | 50 |
| Isobutylene | 6 |
| Butanes | 9 |

The reactor was maintained at about 45° F., and a pressure of 3 to 5 pounds per square inch gauge. Flow was at the rate of 10 cubic feet per cubic foot of absorbent per hour and a sufficient depth of absorbent was used so that the gas was completely stripped of butadiene for a period of four hours. At the end of this time flow was stopped and the tower evacuated. Warm water was then circulated through the cooling system, raising the temperature to 175° F. It was maintained here 30 minutes, and the desorbed gas was pumped from the absorber and liquefied into a tank. Analysis showed that the gas contained over 99% butadiene and was free of all harmful acetylene derivatives.

The last butadiene was evacuated, the reagent cooled again to 45° F. and gas flow was again continued for four hours with similar complete stripping of butadiene from the stream and subsequent desorption of 99% butadiene.

Example II

A saturated solution of cuprous chloride in concentrated hydrochloric acid was sprayed onto activated charcoal to produce a reagent containing 25% by weight of cuprous salt. The hydrochloric acid was removed by heating the reagent in a stream of inert gas at 250° F. until acid was no longer detectable in the gas stream.

A hydrocarbon gas containing 5% of butadiene was passed over the cuprous chloride reagent. The effluent gases contained only a negligible amount of butadiene, and desorption of the reagent when saturated with butadiene yielded a gas containing 98% of the diolefin.

*Example III*

A liquid $C_3$—$C_4$ hydrocarbon fraction containing 3% by weight of butadiene was passed at a rate of 2 liquid volumes per hour per volume of reagent and at a pressure of 100 pounds gauge over a reagent consisting of bauxite impregnated with 25 per cent by weight of substantially anhydrous cuprous chloride. The bauxite was undried prior to impregnation and the finished reagent had a water content of less than 2% by weight. The absorption temperature was 40° F.

The liquid effluent from the reagent was free of butadiene. When the reagent capacity was spent, the flow of hydrocarbon was stopped, residual liquid was forced out with inert gas while the temperature was allowed to rise toward the desorption range. Desorption was carried out as in Example I with recovery of butadiene of over 98% purity.

While our invention has been described with particular emphasis on the absorption of butadiene, we have found that under proper conditions other diolefins such as cyclopentadiene, isoprene and various hexadienes may be absorbed and concentrated from hydrocarbon mixtures of the corresponding boiling ranges. Obviously to obtain pure butadiene reasonably close cut $C_4$ fractions must be treated, although of the lower-boiling materials only acetylene and its homologues and carbon monoxide are possible contaminants.

We claim:

1. A process for the removal of diolefins from hydrocarbon fluids containing the same which comprises contacting said hydrocarbon fluids with a solid reagent comprising a solid adsorbent carrier selected from the group consisting of adsorbent clays, bauxite, charcoal, silica gel, and synthetic activated alumina impregnated with cuprous halide whereby a diolefin-cuprous halide complex is formed and retained on said carrier.

2. A process for the removal of diolefins from hydrocarbon fluids containing the same which comprises contacting said hydrocarbon fluids with a solid reagent comprising an adsorbent clay carrier impregnated with cuprous halide whereby a diolefin-cuprous halide complex is formed and retained on said carrier.

3. A process for the removal of diolefins from hydrocarbon fluids containing the same which comprises contacting said hydrocarbon fluids with a solid reagent comprising an adsorbent charcoal carrier impregnated with cuprous halide whereby a diolefin-cuprous halide complex is formed and retained on said carrier.

4. A process for the removal of diolefins from hydrocarbon fluids containing the same which comprises contacting said hydrocarbon fluids with a solid reagent comprising an adsorbent bauxite carrier impregnated with cuprous halide whereby a diolefin-cuprous halide complex is formed and retained on said carrier.

5. A process for the removal of butadiene from hydrocarbon fluids containing the same which comprises contacting said hydrocarbon fluids with a solid reagent prepared by impregnating a solid adsorbent carrier selected from the group consisting of adsorbent clays, bauxite, charcoal, silica gel, and synthetic activated alumina with a cuprous chloride solution whereby a butadiene-cuprous chloride complex is formed and retained on said carrier.

WALTER A. SCHULZE.
JOHN C. HILLYER.
HARRY E. DRENNAN.